(12) United States Patent
Rehm et al.

(10) Patent No.: US 6,597,146 B1
(45) Date of Patent: Jul. 22, 2003

(54) METHOD AND APPARATUS TO COMPENSATE FOR CYCLIC LOAD DISTURBANCES IN A CONTROL SYSTEM

(75) Inventors: Thomas J. Rehm, Mequon, WI (US); Peter B. Schmidt, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 10 days.

(21) Appl. No.: 10/072,066

(22) Filed: Feb. 8, 2002

(51) Int. Cl.$^7$ ............................................. G05D 23/275
(52) U.S. Cl. ........................ 318/632; 318/649; 318/611; 318/606
(58) Field of Search ................................ 318/649, 611, 318/606, 607, 608, 460, 623, 648, 561, 615, 616, 617, 632, 610, 609

(56) References Cited

U.S. PATENT DOCUMENTS

| | | | | |
|---|---|---|---|---|
| 4,498,037 A | * | 2/1985 | Razavi | ........................ 318/561 |
| 4,792,737 A | * | 12/1988 | Goff et al. | ................... 318/615 |
| 5,223,778 A | * | 6/1993 | Svarovsky et al. | ......... 318/610 |
| 5,416,397 A | * | 5/1995 | Mazzara et al. | ............ 318/696 |
| 5,920,173 A | * | 7/1999 | Mercadal et al. | ........... 318/649 |
| 6,144,181 A | | 11/2000 | Rehm et al. | |

OTHER PUBLICATIONS

Iwasaki, Makoto, "Robust Speed Control of IM with Torque Feedforward Control," IEEE Transactions on Industrial Electronics, vol. 40, No. 6, Dec. 1993, pp. 553–560.

* cited by examiner

*Primary Examiner*—Karen Masih
(74) *Attorney, Agent, or Firm*—Quarles & Brady; Alexander M. Gerasimow; William R. Walbrun

(57) ABSTRACT

A method and apparatus for essentially eliminating cyclic disturbances in a motor control system, the method including identifying frequencies of undesirable components in a feedback signal that exceed a threshold level and generating a combined signal including sine wave components corresponding to each of the identified frequencies, delaying the combined signal to generate a plurality of identical but phase shifted combined signals, weighting each one of the delayed signals as a function of the magnitude of an instantaneous corrected signal which is the difference between a velocity error signal and a compensation signal and adding each of the weighted signals to generate the compensation signal.

51 Claims, 8 Drawing Sheets

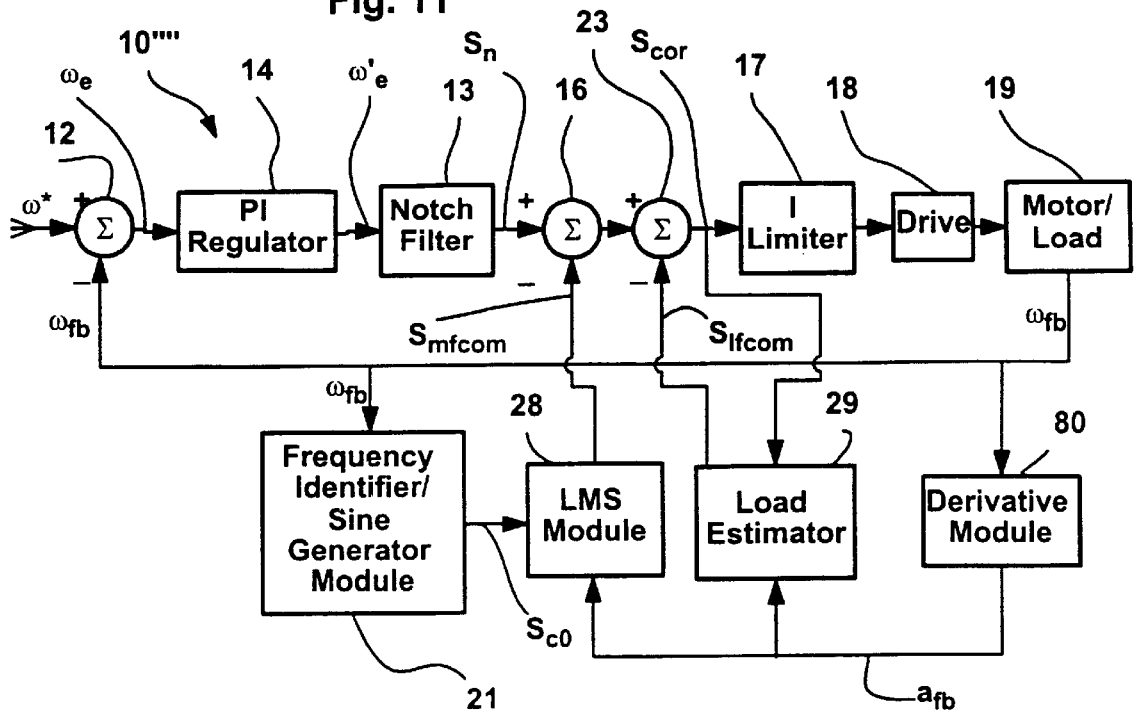
Fig. 11
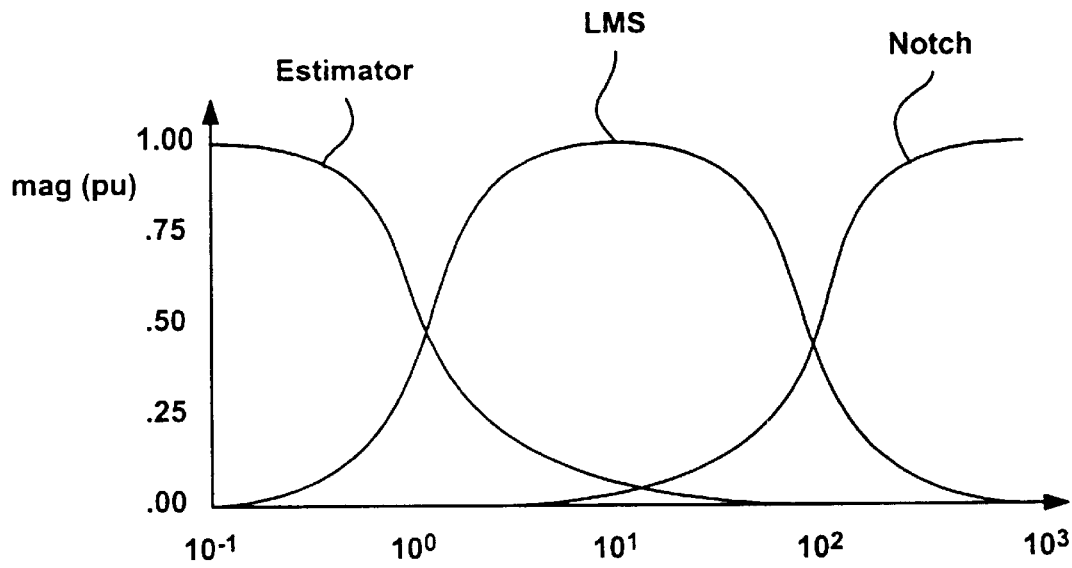
Fig. 12    Frequency (Hz)

METHOD AND APPARATUS TO COMPENSATE FOR CYCLIC LOAD DISTURBANCES IN A CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is motor controllers and more specifically filtering systems for removing cyclic load disturbances from motor control systems.

An exemplary motor control system includes a controller and a motor drive. The drive is linked to a motor and provides currents to motor windings thereby causing a motor rotor to rotate within a stator construct. To this end, a controller typically receives one or more command signals that indicate intended motor operating characteristics. For instance, one exemplary intended characteristic may be rotor velocity which is received by the controller in the form of a command velocity signal. The controller is programmed to provide control signals to the drive to cause the motor to operate in accordance with the command signals. The drive receives the control signals and attempts to drive the motor in accordance therewith.

Unfortunately, many motor drive applications are characterized by mechanical and electrical disturbances that hamper the control process and cause the motor to operate in other than the commanded fashion. Some of the disturbances are non-cyclic while others are cyclic. For instance, an increased load is a change that occurs over an operating period and therefore is not cyclic. In contrast, mechanical resonances (e.g., a dual inertia motor-load system with a spring-like coupling that exists between the inertias) and electrical disturbances (e.g., system force induced by the mutual torques that exist in the harmonics associated with back electromotive forces (EMFs)) are typically cyclic and hence occur at system specific and recurring frequencies.

To minimize the affects of system disturbances, many control systems include one or more sensors and corresponding feedback loops. The sensors are configured and positioned so as to measure motor operating parameters and provide feedback signals to the controller. For instance, one feedback signal may include a feedback velocity signal. In the case of a velocity feedback system, the controller compares the command velocity signal to the feedback velocity signal and generates an error command signal for controlling the drive. The controller may simply subtract the feedback signal from the command velocity signal and use the difference as a velocity error signal for controlling the drive. Typically, to expedite control, the velocity error signal is manipulated (e.g., via a PI controller) prior to being fed to the drive.

Conventional feedback systems achieve their end results (i.e., reduce the affects of system disturbances) in a less than optimal fashion by overshooting and undershooting command signals and thereby cause system errors. For instance, where motor velocity is below a commanded velocity, conventional feedback control systems simply increase the velocity error signal until the feedback velocity is above the commanded velocity. Thereafter the feedback signal indicates that the motor velocity is higher than the commanded velocity and the controller reduces the velocity error signal until the motor velocity, as represented by the feedback signal, is again below the commanded velocity. This overshooting and undershooting process is repeated without end and never reaching constant steady state.

With respect to non-cyclic disturbances (e.g., a slowly changing load), conventional feedback controllers work relatively well as, after several cycles, a steady state condition should result. Unfortunately, in the case of cyclic disturbances, the target compensated signal must inversely mirror the changing disturbance and therefore the overshoot and undershoot problem persists.

For instance, assume a command velocity of 2 Hz and a cyclic disturbance including an 8 Hz component and a 16 Hz component. In this case, the combined feedback signal includes 2, 8 and 16 Hz components and therefore the velocity error signal is dynamic and includes 8 and 16 Hz components. Thus, despite the recurring cyclic nature of the disturbances, the conventional feedback system would be unable to eliminate the disturbances without generating persistent overshoot and undershoot related noise.

BRIEF SUMMARY OF THE INVENTION

It has been recognized that, in the case of cyclic-type disturbances, the frequencies of the most prominent instantaneous cyclic disturbances can be determined and used to, in effect, anticipate the cyclic characteristics of subsequent disturbances, the anticipated characteristics thereafter being used to modify the velocity error signal that represents the difference between the commanded signal and the feedback signal. To this end, to anticipate subsequent characteristics of a cyclic disturbance, three characteristics of the disturbance have to be identified. First, the frequencies corresponding to the separate components of the disturbance have to be identified. Second, the phases of the separate components of the disturbance have to be identified. Third, the amplitudes of the disturbance components have to be identified. After frequencies, phases and amplitudes of the disturbance components are identified, a compensation signal mirroring the disturbance can be generated and subtracted from the manipulated velocity error signal to generate a corrected error signal that essentially anticipates the disturbance and compensates therefore.

To this end, an exemplary embodiment of the invention includes an apparatus for reducing cyclic noise in a motor drive system where the drive system subtracts a velocity feedback signal from a velocity command to generate a velocity error signal and uses the velocity error signal to control other drive system components, the apparatus comprising a frequency identifier that receives a velocity feedback signal and identifies unintended frequencies of unintended components of the feedback signal where each unintended component is characterized by a component specific phase and amplitude, a sine generator that generates a combined signal characterized by a separate sinusoidal component corresponding to each of the undesirable frequencies, a tuning signal identifier linked to at least one system component output and providing a tuning signal corresponding to the at least one component output, an LMS module that mathematically combines the combined signal and the tuning signal to generate a compensation signal characterized by a separate component corresponding to each identified unintended frequency where each separate component of the compensation signal is essentially in phase with and has an amplitude similar to a corresponding unintended component; and a regulator module that mathematically combines the velocity error signal and the compensation signal to generate a corrected signal used to control other drive components.

In at least one embodiment the sine generator includes a plurality of separate sine modules and a second summer, the transform module providing a separate one of the unintended frequencies to a different one of the sine modules, each sine module receiving an unintended frequency generating a sine wave signal at the unintended frequency, the sine wave signals provided to the second summer and the second summer mathematically combining the sine wave signals to generate the combined signal. The second summer may mathematically combine by adding the sine wave signals.

In at least one embodiment the frequency identifier includes a Fast Fourier Transformer (FFT) module that generates frequency signals corresponding to each frequency present in the feedback signal. The frequency identifier may further include a frequency discriminator that receives the frequencies generated by the FFT module and identifies a sub-set of the received frequencies as unintended frequencies.

The discriminator may also receive the command velocity signal and, when the command velocity signal is a square wave having a fundamental frequency, identifies odd multiple harmonics of the command velocity signal and identifies frequencies other than the fundamental frequency and odd multiples of the fundamental frequency that have magnitudes greater than a threshold magnitude as the unintended frequencies.

The LMS module may mathematically combine by altering the phase and amplitude of the combined signal as a function of the tuning signal. To this end, in at least one embodiment where the combined signal is an original combined signal, the LMS module includes N delays, N+1 weighting modules, N+1 integrators, N+1 multipliers and an LMS summer and wherein the delays are serially arranged to receive the combined signal and delay the combined signal to generate N separate and uniquely delayed combined signals, each of the original signal and the delayed signals provided to a separate one of the weighting modules and also to a separate one of the multipliers, each multiplier further receiving the tuning signal and mathematically combining the tuning signal and the corresponding delayed signal and providing an output signal to a separate one of the integrators, each integrator integrating the received output signal and providing a weight signal to a corresponding one of the weighting modules, each weighting module manipulating a corresponding one of the original or delayed signals to generate a weighted signal, the LMS summer receiving and mathematically combining each of the weighted signals to generate the compensation signal.

Each multiplier may mathematically combine by multiplying a corresponding one of the original and delayed signals and the tuning signal.

The LMS module may further include a rate gain module that manipulates the tuning signal by a factor k and provides the manipulated error signal as the tuning signal to each of the multipliers. The regulator module in some embodiments includes a PI regulator and a summer and wherein the PI regulator receives and manipulates the velocity error signal to generate a modified error signal and the summer subtracts the compensation signal from the modified error signal to generate the corrected signal. Here, the apparatus may further include a derivative module that receives the velocity feedback signal and converts the velocity feedback signal into an acceleration feedback signal and, wherein, the acceleration feedback signal is the tuning signal. In the alternative, either the corrected signal or the velocity error signal may be the tuning signal.

Moreover, in some embodiments the regulator module further includes a summer that subtracts the compensation signal from the velocity error signal to generate an intermediate corrected signal and a PI regulator that receives and modified the intermediate corrected signal to generate the corrected signal and, wherein, the intermediate corrected signal is the tuning signal.

The invention further includes a method for reducing harmonic noise in a motor drive where the drive subtracts a velocity feedback signal from a velocity command to generate a velocity error signal and uses the velocity error signal to control other drive components. The method comprised the steps of obtaining a system velocity feedback signal, identifying unintended frequencies of unintended components of the feedback signal where each unintended component is characterized by a component specific phase and amplitude, generating a combined signal characterized by a separate sinusoidal component corresponding to each of the undesirable frequencies, identifying a tuning signal corresponding to at least one system component output, mathematically combining the combined signal and the tuning signal to generate a compensation signal characterized by a separate component corresponding to each identified unintended frequency where each separate component of the compensation signal is essentially in phase with and has an amplitude similar to a corresponding unintended component and mathematically combining the velocity error signal and the compensation signal to generate a corrected signal used to control other drive components.

The step of generating the combined signal, in some embodiments, includes the steps of generating separate sine wave signals at each of the unintended frequencies and mathematically combining the sine wave signals to generate the combined signal. Here, the step of mathematically combining the sine wave signals may include the step of adding the sine wave signals.

The step of identifying may include the step of performing a Fast Fourier Transformer (FFT) on the feedback signal. Here, the step of identifying further may include, when the command velocity signal is a square wave having a fundamental frequency, identifying odd multiple harmonics of the command velocity signal and identifying frequencies other than the fundamental frequency of the command velocity signal and odd multiples of the fundamental frequency that have magnitudes greater than a threshold magnitude as the unintended frequencies.

In some embodiments the step of mathematically combining the combined signal and the tuning signal includes altering the phase and amplitude of the combined signal as a function of the tuning signal. Here the combined signal may be an original combined signal and the step of altering the phase and amplitude may include the steps of delaying the combined signal to generate N separate and uniquely delayed combined signals, for each of the original combined signal and delayed combined signals: (i) mathematically combining each of the original and delayed combined signals with the tuning signal to generate an output signal, (ii) integrating the output signal to generate a weight signal and (iii) mathematically combining the weight signal and the corresponding combined signal to generate a weighted signal and mathematically combining the weighted signals to generate the compensation signal.

In some embodiments the step of mathematically combining the velocity error signal and the compensation signal includes providing the error signal to a PI regulator that manipulates the velocity error signal to generate a modified error signal and subtracting the compensation signal from the modified error signal to generate the corrected signal.

Moreover, the apparatus for performing the methods described above may include a processor running a pulse sequencing program.

In addition to the apparatus and methods described above, it has been recognized that particularly advantageous disturbance reduction and elimination can be accomplished throughout the entire possible frequency range of disturbances by combining the inventive LMS filter configuration with other filters and disturbance eliminators. To this end, it has been recognized that the disturbance spectrum can generally be divided into three separate ranges including a low frequency range (e.g., 1–3 Hz.), a middle frequency range (e.g., 3–30 Hz.) and a high frequency range (e.g., 30 Hz–1 kHz). Generally, given typical system operation all frequency components within the high frequency range will comprise unintended system disturbances and therefore a notch filter tuned to eliminate high frequency components appreciably reduces the work required of the LMS filter.

At low frequencies, while the LMS filter may operate to eliminate unintended frequency components, it has been found that because of the low frequency of these components, the LMS filter becomes burdened by these components and may not operate in an ideal fashion. This is particularly true where the low frequencies of disturbances cause the disturbances to be similar to DC values. Thus, in some cases it is advantageous to include a low frequency range disturbance eliminator of some type to alleviate the LMS filter from having to remove low frequency disturbances.

Thus, at least some embodiments of the invention are also for substantially reducing the entire range of possible system noise and further include a notch filter that receives the velocity error signal and filters out resonant high frequency components of the velocity error signal thereby generating a modified velocity error signal and wherein the summer mathematically combines the modified velocity error signal and the compensation signal to generate the corrected signal.

Some embodiments further include a load estimator and a load estimator summer, the estimator also receiving the system feedback signal and a modified control signal and combining the received signals to generate a low frequency compensation signal, the estimator summer mathematically combining the corrected signal and the low frequency compensation signal to generate the modified control signal, the modified control signal also provided to the other drive components for control purposes. The frequency identifier may limit unintended components to frequencies within a middle frequency range (e.g., 3 through 30 Hz).

While advantageous to include each of a notch filter, an LMS filter and a load estimator in a system configuration, some embodiments may include an LMS filter and a load estimator without a notch filter or may include a notch filter and an LMS filter without an estimator. In addition, while the embodiment described herein teaches that the LMS filter feeds the load estimator, the order of the LMS filter and the estimator may be reversed.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 11 is a schematic similar to FIG. 1, albeit of a configuration including an inventive LMS module in conjunction with a notch filter and a load estimator; and FIG. 12 is a graph corresponding to FIG. 11 illustrating the disturbance frequency ranges addressed via filters and modules of FIG. 11.

DETAILED DESCRIPTION OF THE INVENTION

Figure 1:
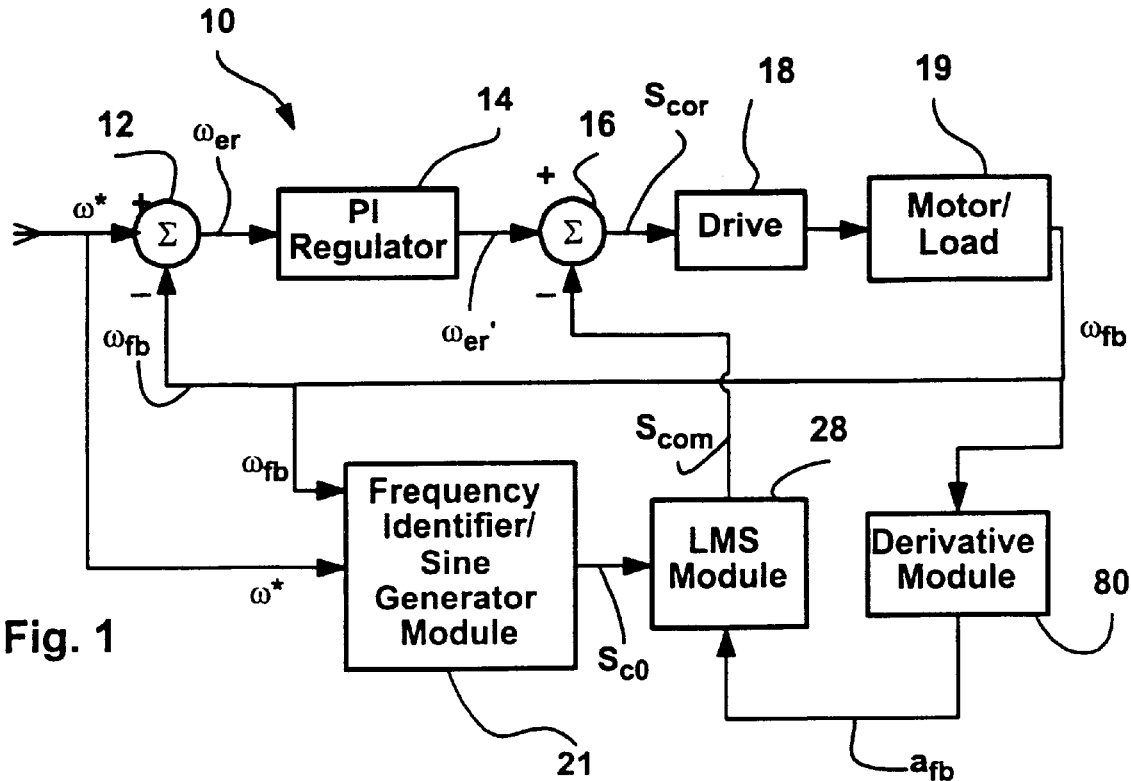
FIG. 1 is a schematic diagram of a control system according to the present invention.

While the following description details various blocks, steps, and functions, it should be understood that all of these elements are meant to be implemented in software as computer programs and represent algorithms for execution by a conventional-type digital processor adapted for industrial applications.

Hereinafter, generally, a velocity command is provided to a controller which includes a velocity feedback loop that provides a velocity feedback signal. The controller subtracts the feedback signal from the command signal thereby generating a velocity error signal. The present invention uses the feedback signal to identify a compensation signal that is subtracted from the manipulated velocity error signal thereby generating a corrected signal which is also referred to herein as a correction error signal. Hereinafter, unless indicated otherwise, the labels "command signal", "feedback signal", "velocity error signal", "compensation signal", "corrected signal" and "correction error signal" are used in a manner consistent with the description above. In addition, it will be assumed that an exemplary disturbance includes 8 Hz and 16 Hz components.

A. Theory

Ideally, in the case of cyclic disturbances that appear in a feedback signal, as the label "cyclic" implies, the disturbances are repetitive and therefore, if the characteristics of a disturbance can be determined at one point in time, the characteristics can be used to compensate for the disturbance at subsequent times. Often a perceived disturbance will have several sources where each source generates a separate disturbance component, each component occurs at a unique cyclic frequency and is characterized by a unique amplitude and where the separate components are out of phase. Hereinafter, unless indicated otherwise, while there may be separate causes for each disturbance component, in the interest of simplifying this explanation, the combined components (i.e., 8 and 16 Hz components in the present example) of the exemplary disturbance will be referred to generally as a disturbance.

In the case of a cyclic disturbance, the repetitive characteristics of interest include frequency, phase and amplitude of each of the disturbance components. Thus, generally, if the frequency, phase and amplitude of each of the disturbance components can be determined at one point in time, these characteristics can be used to compensate for the disturbance subsequently.

While cyclic disturbances are generally cyclic over relatively short periods, over longer periods and as signals are modified to account for the effects of the disturbances, the characteristics of a cyclic disturbance often change. For instance, in the case of an increasing load (e.g., a spindle on which a web material is being wound), as the load increases, the period of a cyclic disturbance may change (e.g., the period may change over several minutes). Similarly, when a compensation signal is used to compensate for an identified cyclic disturbance, the disturbance amplitude or phase may change slightly. For this reason, the inventive filter system has been designed to automatically adapt to changes in disturbance frequency, phase and amplitude and also to adapt to newly perceived cyclic disturbances or disturbances that cease to be perceived during operation.

The frequencies of separate disturbance components can be determined relatively easily. To this end, in at least one embodiment of the invention, a velocity feedback signal can be fed to a Fast Fourier Transform (FFT) module to identify the frequencies that appear in the feedback signal. Expected frequencies are ignored. For example, it is expected that the command frequency be present in the feedback signal and therefore the command frequency is ignored. Similarly, where the command velocity signal is a square wave, it is expected that odd multiples of the command frequency will also appear in the feedback signal and therefore odd multiples of the command frequency are also be ignored. For instance, where the command frequency is 2 Hz, harmonics are expected and are ignored at 6 Hz (i.e., 2×3 Hz), 10 Hz (i.e., 2×5 Hz), 14 Hz, 18 Hz, etc.

Disturbance components at non-expected and undesirable frequencies that exceed a threshold level are identified. Sine wave generators are used to generate separate sine waves at each of the components corresponding to an undesirable frequency.

After separate sine waves for each of the components corresponding to a non-expected frequency have been generated, the separate sine waves have to be phase shifted and amplified generating compensation signals where each compensation signal is in phase with, and has the same amplitude as, a corresponding disturbance component. Thus, for instance, where the 8 Hz sine wave leads the corresponding 8 Hz disturbance component by 30 degrees and has an amplitude that is 50% less than the amplitude of the 8 Hz disturbance component, the 8 Hz sine wave has to be phase shifted by 30 degrees and the amplitude has to be increased by a factor of 2. Similarly, where the 16 Hz sine wave leads the corresponding 16 Hz disturbance component by 40 degrees and has an amplitude that is 33% less than the amplitude of the disturbance, the 16 Hz sine wave has to be phase shifted by 40 degrees and the amplitude has to be increased by a factor of 3/2. After appropriate phase shifts and scaling the resulting compensation signals must be subtracted from the manipulated velocity error signal (i.e., the difference between the command and feedback signals after PI compensation) to generate the corrected signal (also referred to as the correction error signal) used to control the motor drive.

The present invention includes a novel method for adaptively identifying the scaling factors and phase shift for each of the disturbance component sine wave signals and for combining the sine wave components to generate the compensation signal. To this end, generally, in at least one embodiment, the separate disturbance component sine waves are generated so that each has a nominal and identical amplitude and so that the components are aligned meaning that each sine wave generated crosses zero at the same phase angle as the sine wave having the lowest frequency (despite being employed in this exemplary embodiment, these rules are not necessary). The nominal sine waves are added together to generate a combined signal including a separate sinusoidal component corresponding to each of the non-expected or undesirable frequencies. Thereafter, the combined signal is delayed several times to provide a series of identical but phase shifted combined signals which are collectively referred to hereinafter as delayed signals. Next, each of the delayed signals is provided to a separate weighting module where each delayed signal is weighted and the weighted delayed signals are then added together and provided as the compensation signal. The compensation signal is subtracted from the velocity error signal to generate the correction error signal (i.e., the corrected signal used to control the drive).

Load disturbances show up in the velocity feedback signal and immanent velocity feedback signal disturbances can be identified by taking the derivative of the velocity signal to generate an acceleration feedback signal. Thus, it has been recognized that the magnitude and phase of the acceleration feedback signal are indicative of the amplitude and phase of the required compensation signal. For this reason, the velocity feedback signal can be used to adjust each separate weighting module weight thereby increasing the affects of delayed signals that are in phase with non-zero portions of the acceleration feedback signal to adjust the amplitude of the compensation signal appropriately.

In at least one embodiment the weight adjustment process includes, for each delayed signal, multiplying the instantaneous delayed signal value by the acceleration feedback signal (or a scalar thereof) and integrating the resulting values to generate an instantaneous weight signal to be applied by a corresponding weighting module. In this fashion the delayed signals that are in phase with cyclic disturbances represented by the acceleration feedback signal are amplified through both scaling and integration and the delay signals that are not in phase with the disturbances are minimized. Eventually, after a few processing cycles, the sum of the weighted signals mirrors the combined cyclic components in the velocity error signal $\omega_{er}$ in all characteristics including component frequencies, phases and amplitudes and thus the compensation signal (i.e., the weighted signal sum) fully and precisely compensates for cyclic disturbances.

Here the acceleration feedback signal is, in effect, a tuning signal which is used to tune the weighting function to generate a desired compensation signal. Other tuning signals are also contemplated and are described below.

B. Hardware

Referring now to the drawings wherein like reference characters represent similar elements and components throughout the several views and, more specifically, referring to FIG. 1, the present invention will be described in the context of an exemplary control system 10 linked to a drive 18 and motor/load 19. Generally, system 10 receives a command velocity signal ω* and a velocity feedback signal $\omega_{fb}$ from a sensor corresponding to motor/load 19 and uses those two signals to generate a corrected control signal $S_{cor}$ that is provided to drive 18 that should cause drive 18 to drive motor/load 19 at the commanded frequency ω*.

Figure 2:
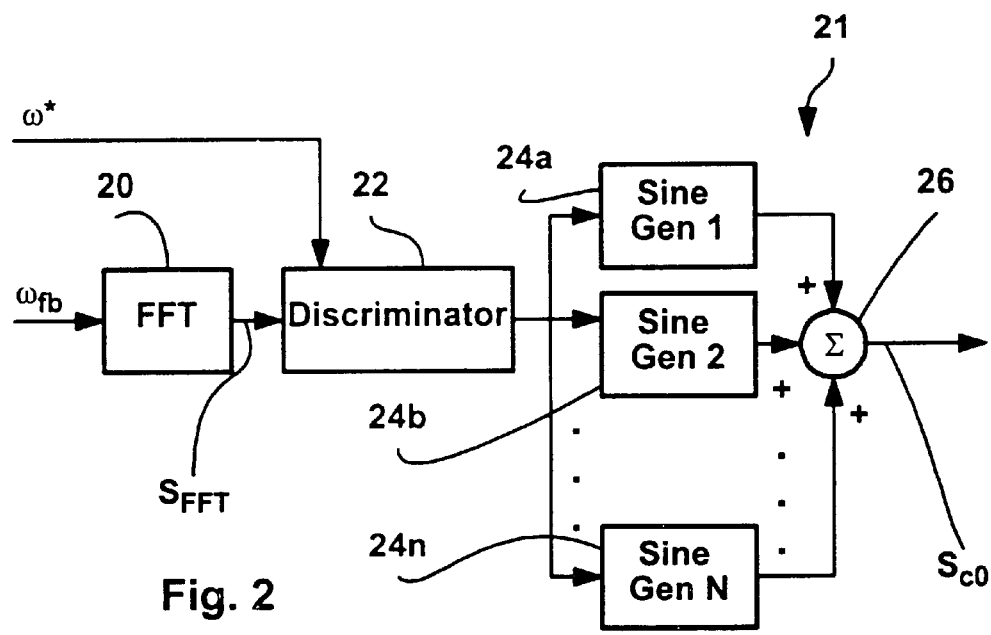
FIG. 2 is a detailed schematic diagram of the frequency identifier/sine generator module of FIG. 1.

To this end, referring to FIGS. 1 and 2, system 10 includes first, second and third summers 12, 16 and 26, respectively, a proportional-integral (PI) regulator 14, a fast Fourier transform (FFT) module 20, a discriminator 22, a plurality of sine wave generators, each separate generator identified by the numeral 24 followed by a lower case letter (i.e., 24a, 26b, etc.), a derivative module 80 and a least means squares (LMS) module 28. Module 20, discriminator 22, modules 24a–24n and summer 26 are collectively referred to herein as a frequency identifier/sine wave generator module while regulator 14 and summer 16 are referred to herein as a regulator module. Summer 12 receives each of the velocity command signal ω* and the velocity feedback signal $\omega_{fb}$ and subtracts the feedback signal $\omega_{fb}$ from the velocity command signal ω* thereby generating a velocity error signal $\omega_{er}$.

Figure 3:
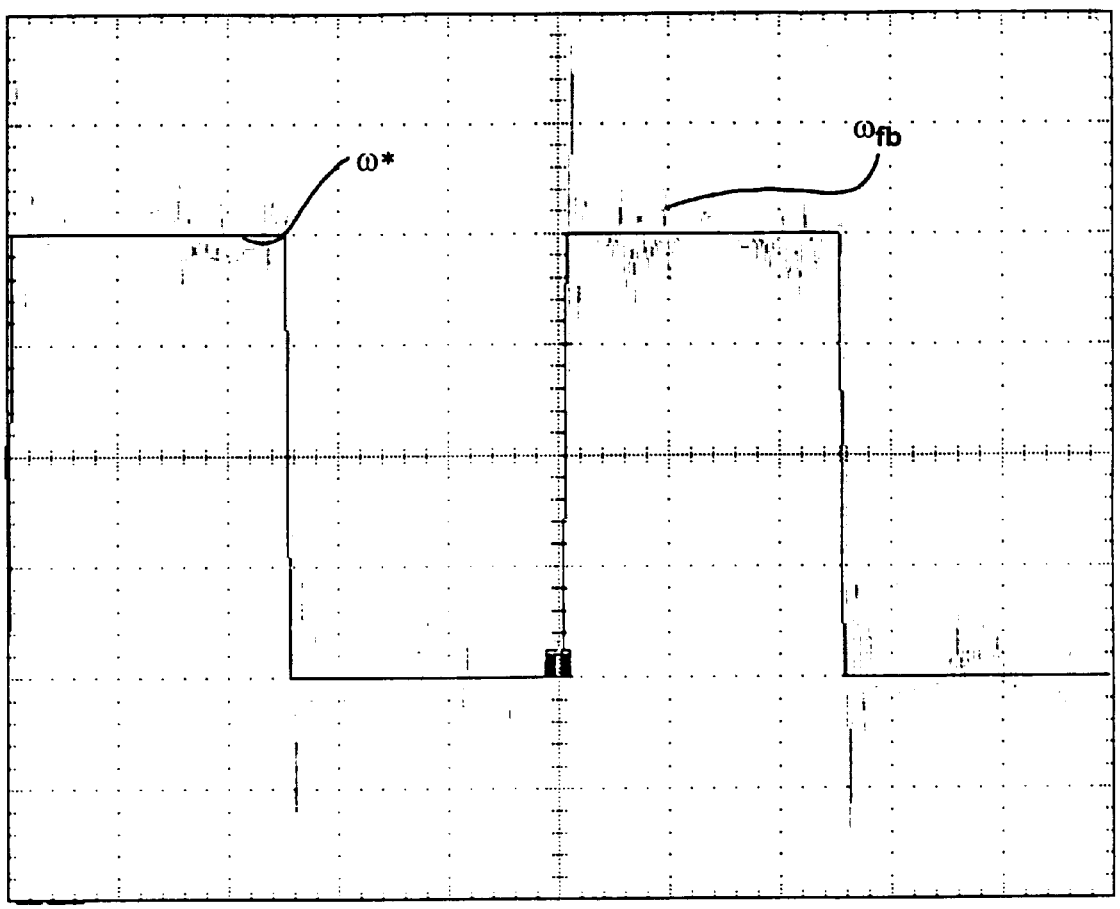
FIG. 3 is a graph illustrating a velocity command signal and a velocity feedback signal.

Referring also to FIG. 3, an exemplary 2 Hz square wave velocity command signal ω* and corresponding velocity feedback $\omega_{fb}$ are illustrated. It should be appreciated that the feedback signal $\omega_{fb}$ includes an appreciable amount noise attributable to system disturbances. In particular, consistent with the example described above, feedback signal $\omega_{fb}$ includes appreciable cyclic harmonics corresponding to 8 Hz and 16 Hz frequencies.

Figure 4:
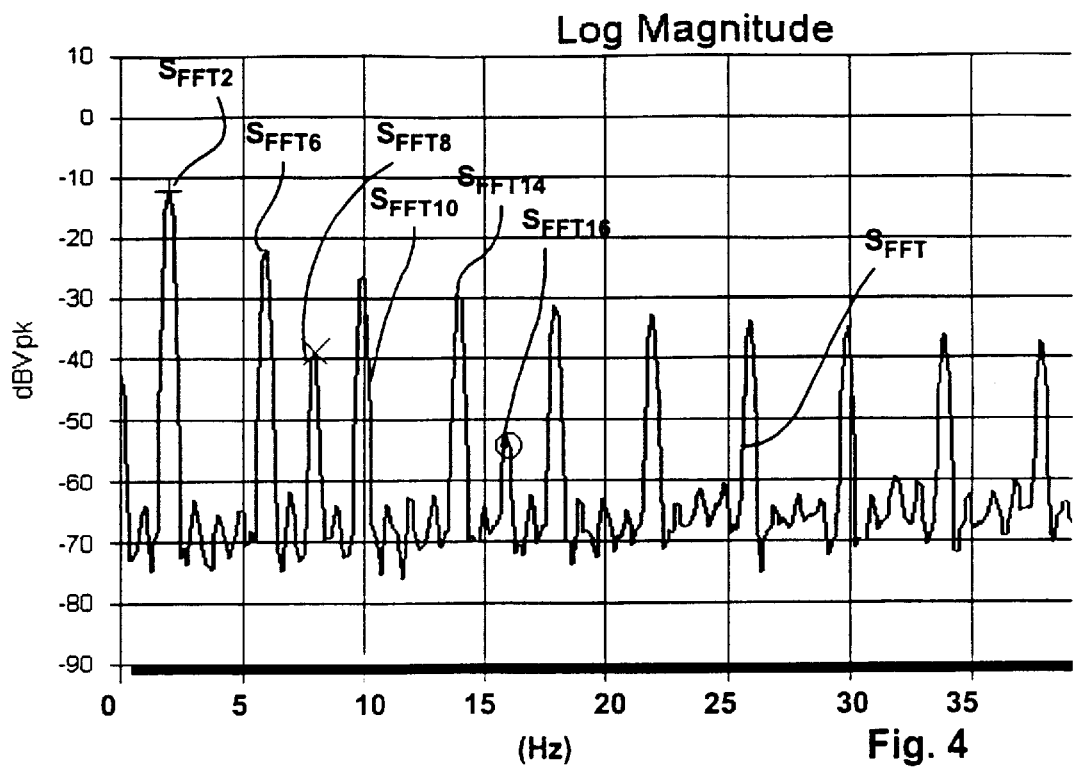
FIG. 4 is a graph illustrating an exemplary FFT spectrum generated by the FFT module of FIG. 1.

Referring still to FIGS. 1 through 3, the velocity feedback signal $\omega_{fb}$ is also provided to the FFT module 20 which performs a Fast Fourier Transform on the received signal and provides an FFT output signal which indicates each of the frequencies of separate components of the feedback signal $\omega_{fb}$ and their corresponding amplitudes. Referring also to FIG. 4, an exemplary FFT output signal $S_{FFT}$ that is consistent with the present example is illustrated. More specifically, as can be seen, the FFT output signal $S_{FFT}$ includes a plurality of harmonics, some of which are expected due to the characteristics of the command signal ω* and some of which are unexpected. For instance, when a 2 Hz square wave command signal ω* is provided, it is expected that the feedback signal $\omega_{fb}$ will include a prominent 2 Hz component. In FIG. 4, the prominent 2 Hz component is identified at point $S_{FFT2}$. Similarly, as well known in the art, with a square wave, in addition to a prominent component at the fundamental frequency, it is expected that there will also be relatively prominent components at every odd multiple of the fundamental component. In the present case, because a fundamental component has a 2 Hz frequency, there should be other fundamental components at 6 Hz, 10 Hz, 14 Hz, 18 Hz, 22 Hz, etc. The prominent 6 Hz component is identified in FIG. 4 at point $S_{FFT6}$, the prominent 10 Hz component is identified at point $S_{FFT10}$.

In addition to the expected harmonic components, there are two additional, relatively prominent undesirable harmonic components in the FFT spectrum of FIG. 4. The unexpected and undesirable components, as illustrated, occur at 8 and 16 Hz frequencies which are identified in FIG. 4 at points $S_{FFT8}$ and $S_{FFT16}$, respectively.

Referring still to FIGS. 1 through 4, discriminator 22 receives each of the velocity command signal ω* and the FFT spectrum SFFT and identifies unexpected harmonic frequency components that exceed a threshold amplitude. To this end, according to at least one embodiment of the present invention, discriminator 22 examines the command signal ω* and first identifies all expected harmonic components that are to be ignored. In the present example, as illustrated in FIG. 4 and described above, the expected components include the fundamental 2 Hz component and all odd multiples thereof (e.g., the $6^{th}$, $10^{th}$, $14^{th}$, etc. harmonics). Next discriminator 22 identifies any other harmonic components above the threshold level that were unexpected and, therefore, in the present example, identifies 8 Hz and 16 Hz frequencies.

Discriminator 22 provides each frequency corresponding to an unexpected component to a separate one of the sine wave generators 24a through 24n. Each sine wave generator generates a sine wave signal having a frequency equal to the frequency received from discriminator 22. In the present example it will be assumed that sine wave generator 24a received the 8 Hz frequency and therefore generates a sine wave signal having 8 Hz frequency while generator 24b received the 16 Hz frequency and therefore generates a 16 Hz sine wave signal. The separate sine wave signals are provided to summer 26 which adds the signals and provides an original combined signal $S_{cO}$ to LMS module 28.

In addition to receiving combined signal $S_{cO}$, LMS module 28 also receives the acceleration feedback signal $a_{fb}$. As described in more detail below, LMS module 28 adaptively selects the phase and amplitude of the various frequency components that comprise the combined signal $S_{cO}$ and that are required to compensate for cyclic disturbances related thereto and generates a compensation signal $S_{com}$ as a function of the adaptations.

Referring again to FIG. 1, PI regulator 14 receives the error signal $\omega_{er}$ and manipulates the error signal to generate a scaled error signal that is provided to summer 16. Summer 16 subtracted the compensation signal $S_{com}$ from the scaled velocity error signal $\omega_{er}'$ thereby generating a corrected signal $S_{cor}$ which is in turn provided to drive 18.

Furthermore, velocity feedback signal $\omega_{fb}$ is provided to derivative module which, as its label implies, takes the derivative of the feedback signal thereby generating an acceleration feedback signal $a_{fb}$ which is provided to LMS module 28. Herein signal $a_{fb}$ is sometimes referred to generally as a tuning signal.

Figure 5:
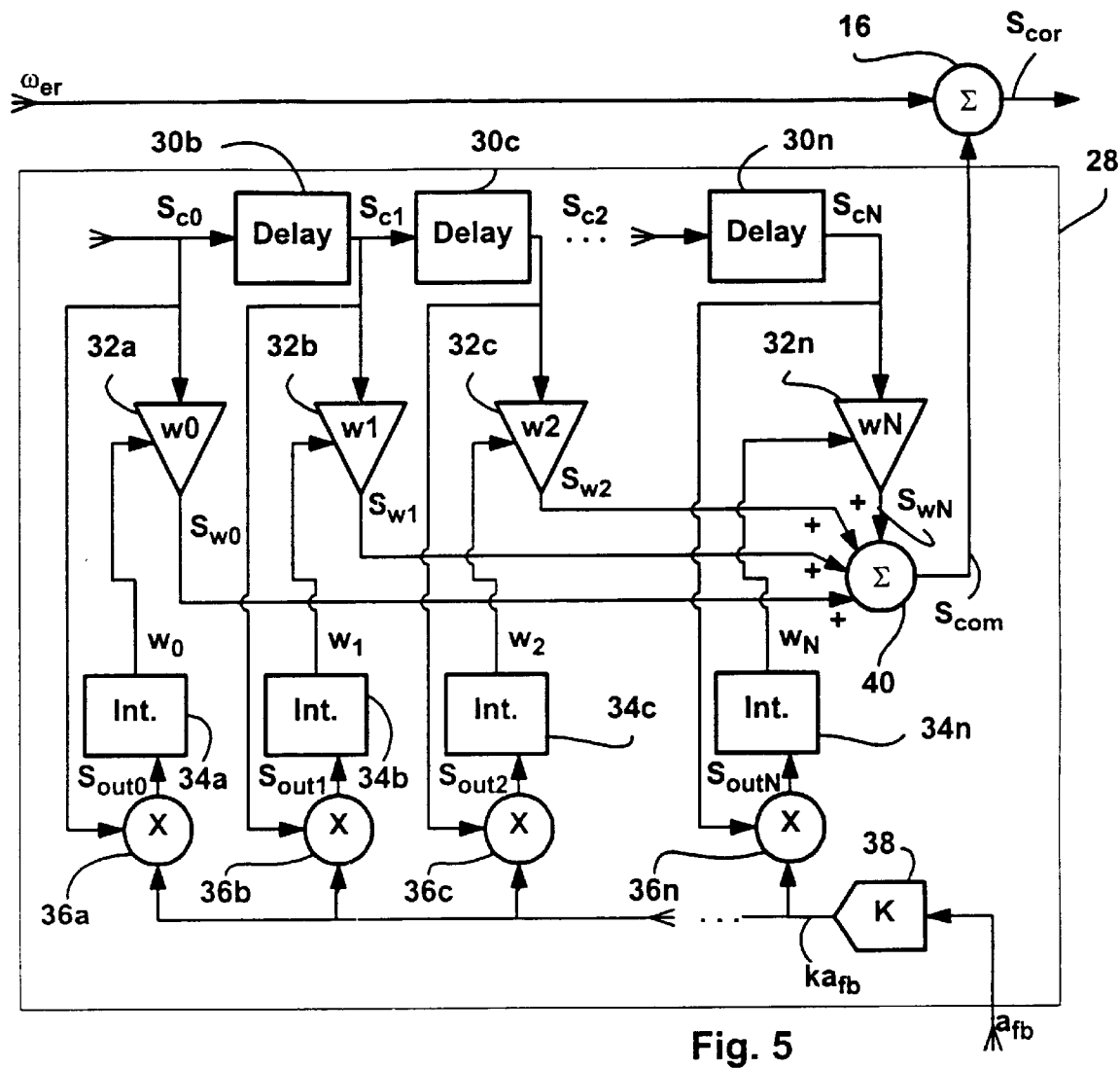
FIG. 5 is a schematic diagram illustrating the LMS module of FIG. 1 in greater detail.

Referring now to FIG. 5, an exemplary LMS module 28 is illustrated in more detail. Module 28 includes a plurality of delay components identified by the numeral 30 followed by a lower case letter (e.g., 30b, 30c . . . 30n), a plurality of weighting modules identified by numeral 32 followed by a lower case letter (e.g., 32a, 32b, etc.), a plurality of integrators identified by numeral 34 followed by a lower case letter (e.g., 34a, 34b, etc.), a plurality of multipliers, each identified by numeral 36 followed by a lower case letter (e.g., 36a, 36b, etc.), a scalar, also referred to as a rate gain module 38, and a summer 40.

Scalar 38 receives the acceleration feedback signal $a_{fb}$ and scales the acceleration feedback signal $a_{fb}$ by a scaling factor k thereby generating a scaled acceleration feedback signal $ka_{fb}$. Scalar k is selectable by a system operator and affects the speed with which LMS module 28 adapts to compensate for cyclic disturbances where a large k value increases the adaptation rate.

The weighting modules, integrators and multipliers are arranged in separate modules legs, each leg including a single weighting module, a single integrator and a single multiplier. For example, a first module leg includes weighting module 32a, integrator 34a and multiplier 36a, a second module leg includes weighting module 32b, integrator 34b and multiplier 36b, and so on. Hereinafter, in the interest of simplifying this explanation, the leg including weighting module 32a and associated components will be referred to as a first leg, the leg including weighting module 32b and associated components will be referred to as a second leg and the leg including weighting module 32c and associated components will be referred to as a third leg.

Each of the module legs receives the scaled tuning signal $ka_{fb}$ and a permutation of the combined signal $S_{c0}$ and uses those signals to generate a weighted signal (e.g., $S_{w0}$) which is provided to summer 40. More specifically, referring still to FIG. 5, multiplier 36a receives the original combined signal $S_{c0}$ and multiplies that signal by the scaled tuning signal $ka_{fb}$ thereby generating a multiplier output signal $S_{out0}$. The output signal $S_{out0}$ is provided to integrator 34a which integrates the received signals and provides a weight signal $w_0$. Weighting module 32a receives the weight signal $w_0$ and the original combined signal $S_{c0}$ and manipulates the combined signal $S_{c0}$ as a function of the weight signal $w_0$ value thereby generating the weighted signal $S_{w0}$ which is provide to summer 40.

Referring still to FIG. 5, the original combined signal $S_{c0}$ is also provided to a first delay module 30b which delays the received signal by a phase angle and thereby generates a first delayed combined signal $S_{c1}$. The second module leg including weighting module 32b and corresponding components is configured in a fashion similar to that of the first module leg described above except that, instead of receiving the original combined signal $S_{c0}$, the second module leg receives the first delayed combined signal $S_{c1}$ and provides a corresponding weighted signal $S_{w1}$ to summer 40. Thus, multiplier 36b multiplies the scaled corrected signal $kS_{cor}$ by first delayed signal $S_{c1}$ providing an output signal to integrator 34b which integrates the received signals and provides a weight signal to weighting module 32b. Weighing module 32b applies the weight signal $w_1$ to the first delayed signal $S_{c1}$ thereby generating weighted signal $S_{w1}$.

First delayed signal $S_{c1}$ is provided to second delay module 30c which, like delay module 30b, delays the received signal by another phase angle thereby generating a second delayed combined signal $S_{c2}$. The third module leg including weighting module 32c and corresponding components, has a configuration similar to that of the first and second module legs except that the third leg receives and combines the second delayed signal $S_{c2}$ with the scaled tuning signal $ka_{fb}$ thereby generating yet another weighted signal $S_{w2}$ which is provided to summer 40.

Although not illustrated, module 28 includes a plurality of other delay modules and corresponding module legs where each module leg receives a differently delayed delay a signal (e.g., $S_{c2}$) and generates a unique weighted signal to be provided to summer 40. Summer 40 receives all of the weighted signals $S_{w0}$ through $S_{wN}$ and, as described above, adds the received signals thereby generating the compensation signal $S_{com}$ which is provided to summer 16 as illustrated in FIGS. 1 and 5.

C. Operation

Figure 7:
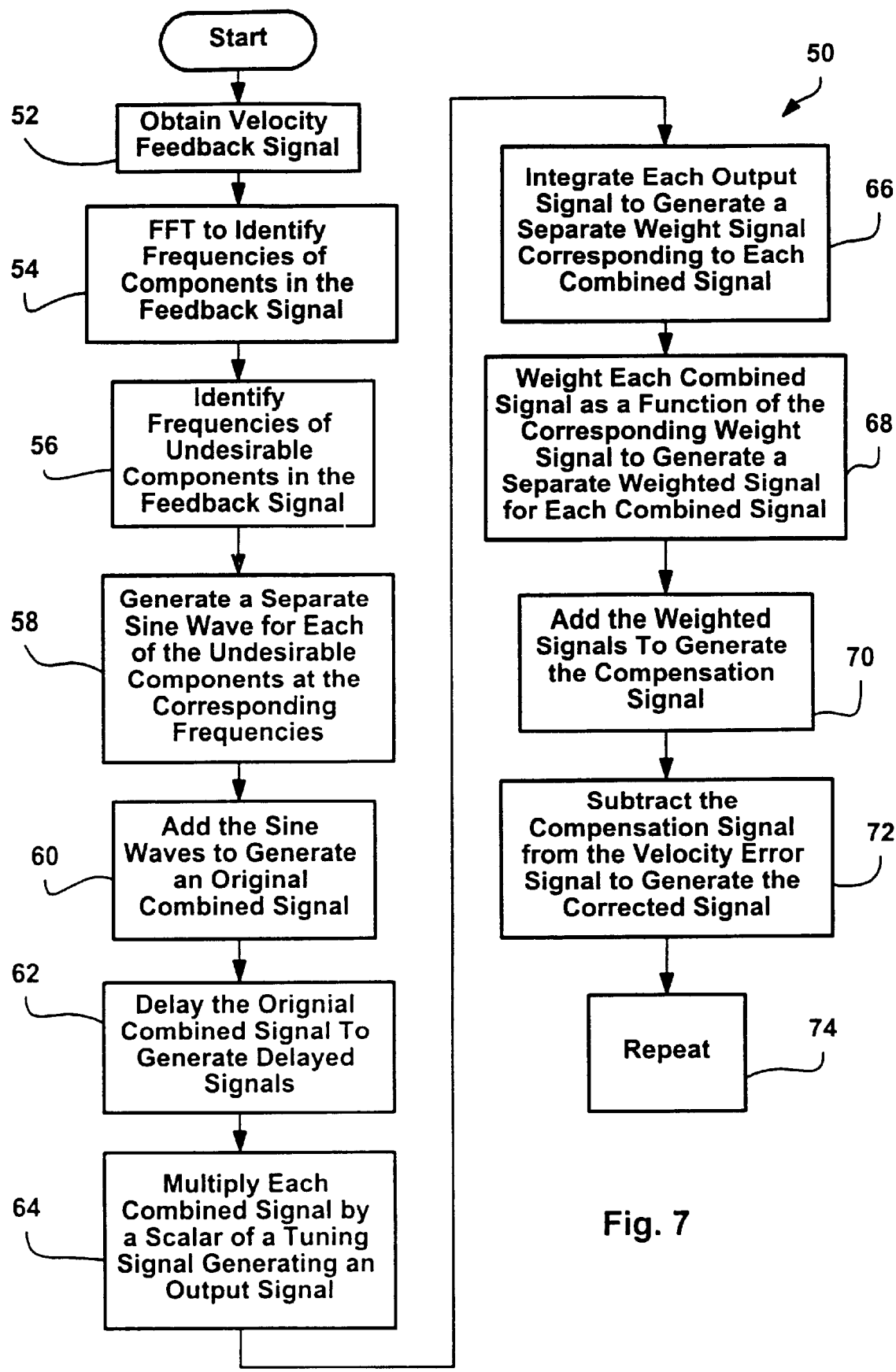
FIG. 7 is a flow chart illustrating a method according to the present invention.

Referring now to FIG. 7, an exemplary method 50 that is performed by the hardware described above with respect to FIGS. 1, 2 and 5 is illustrated. Referring also to FIGS. 1 through 5, with system 10 operating to control drive 18 and motor/load 19, the velocity feedback signal $\omega_{fb}$ is obtained at block 52 and provided to FFT module 20. At block 54, FFT module 20 performs an FFT to identify frequencies of components in the feedback signal $\omega_{fb}$. Next, at block 56, discriminator 22 identifies the frequencies of undesirable components having amplitudes greater than a threshold amplitude that occur in the feedback signal. Each of the frequencies corresponding to an undesirable component is provided to a separate one of the sine wave generators and, at block 58, the sine wave generators generate a separate sine wave for each of the undesirable components at the corresponding frequencies.

Next, summer 26 adds the sine waves that are generated by the sine wave generators to generate an original combined signal at block 60. The original combined signal $S_{c0}$ is provided to LMS module 28. At block 62, the delay modules 30b, 30c, etc., delay the original combined signal $S_{c0}$ to generate the delayed signals $S_{c1}$, $S_{c2}$, etc. At block 64 the multipliers (e.g., 36a) multiply each combined signal (i.e., the original combined signal $S_{c0}$ and each of the delayed signals) by a scalar of the tuning signal $a_{fb}$ (i.e., scaled tuning signal $ka_{fb}$) to generate output signals $S_{out0}$, $S_{out1}$, etc.

Continuing, at block 66, the integrators (e.g., 34a) integrate each output signal to generate a separate weight signal $w_0$, $w_1$, etc., corresponding to each combined signal. At block 68 the weight signals are provided to weighting modules 32a, 32b, etc., and are applied to corresponding combined signals to generate separate weighted signals for each of the combined signals. At block 70 the weighted signals are added to generate the compensation signal $S_{com}$ and at block 72 the compensation signal $S_{com}$ is subtracted from the velocity error signal $\omega_{er}$ to generate the corrected signal $S_{cor}$. At block 74 the process illustrated in FIG. 7 is repeated so that the system adapts over the course of several processor cycles to precisely compensate for cyclic disturbances.

Figure 6:
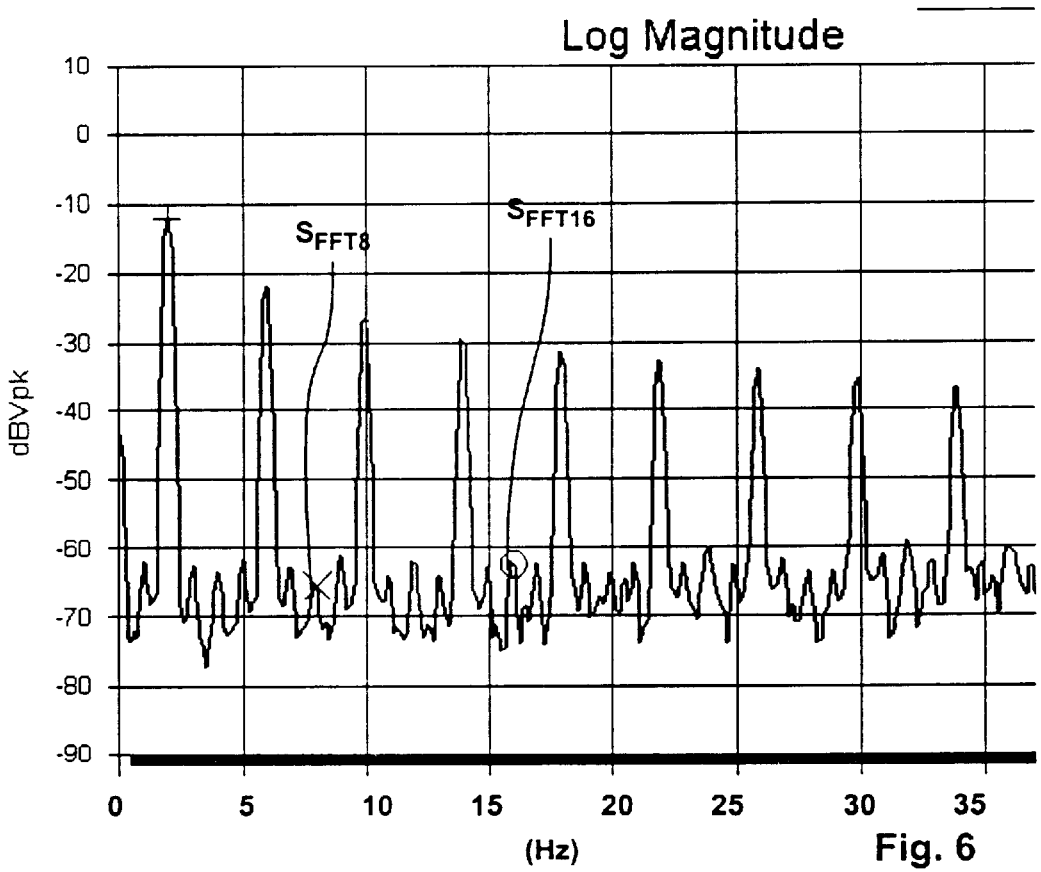
FIG. 6 is a graph similar to FIG. 3, albeit illustrating a FFT spectrum after compensation according to one embodiment of the present invention.

Referring now to FIG. 6, an FFT spectrum similar to the spectrum illustrated in FIG. 4 is illustrated where the inventive compensation scheme described above has been implemented. The frequency components corresponding to 8 Hz and 16 Hz frequencies are identified at points $S_{FFT8}$ and $S_{FFT16}$, respectively. Comparing FIGS. 4 and 6, it should be appreciated that the present invention essentially completely compensates for the cyclic disturbances at 8 Hz and 16 Hz.

D. Additional Embodiments

Referring still to FIG. 1, the embodiment of FIG. 1 is particularly advantageous as the described embodiment essentially eliminates both load and reference cyclic disturbances due to use of the acceleration feedback signal to tune the LMS module. Nevertheless, as indicated above, other configurations are contemplated that employ different tuning signals and that, while perhaps having less desirable end results, nevertheless may be useful in certain system configurations.

Figure 8:
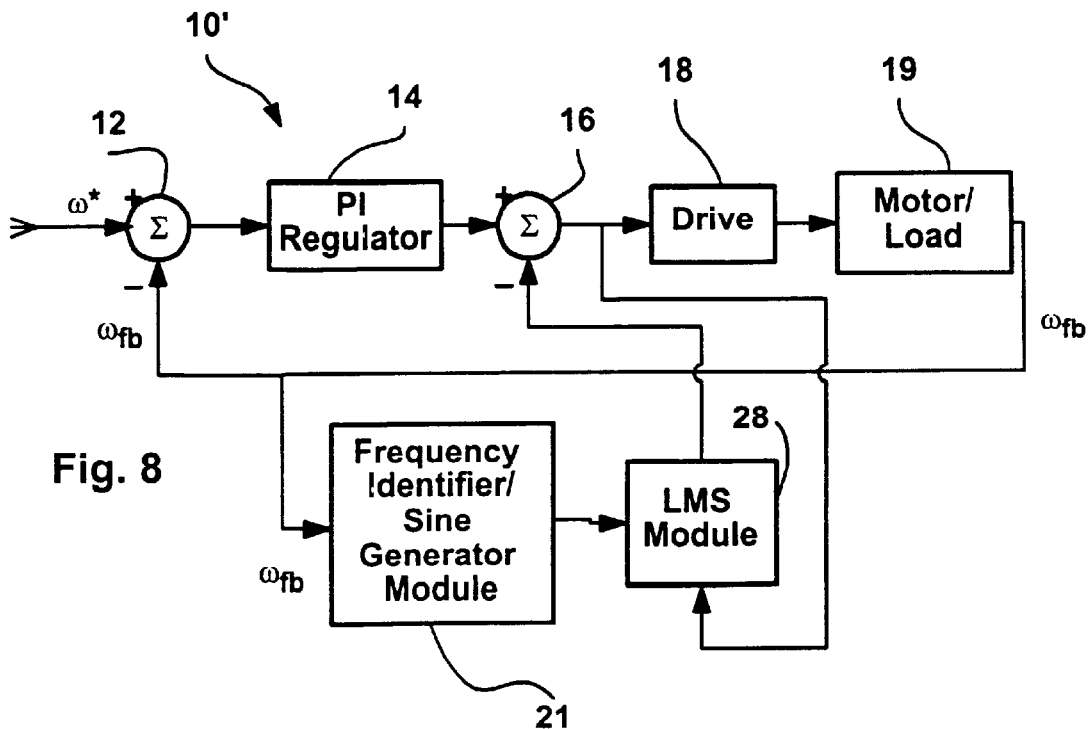
FIG. 8 is a schematic diagram similar to FIG. 1, albeit of another embodiment of the present invention.

To this end, referring now to FIG. 8, a second system 10' for controlling drive 18 and a motor/load is illustrated that can be used with the present invention. Components of system 10' that have numbers identical to the numbers used in FIG. 1 above operate in a similar fashion to the operation described above and therefore will not be described here again in detail. The configuration in FIG. 8 is identical to the configuration in FIG. 1 except that the corrected signal output by summer 16 is used as the tuning signal instead of the acceleration feedback signal. LMS module 28 operates in a manner described above and therefore will not be explained here again in detail. It should be noted here, however, that while embodiment 10' eliminates cyclic reference signal disturbances, embodiment 10' will be minimally effective if at all at reducing or eliminating load related cyclic disturbances.

Figure 9:
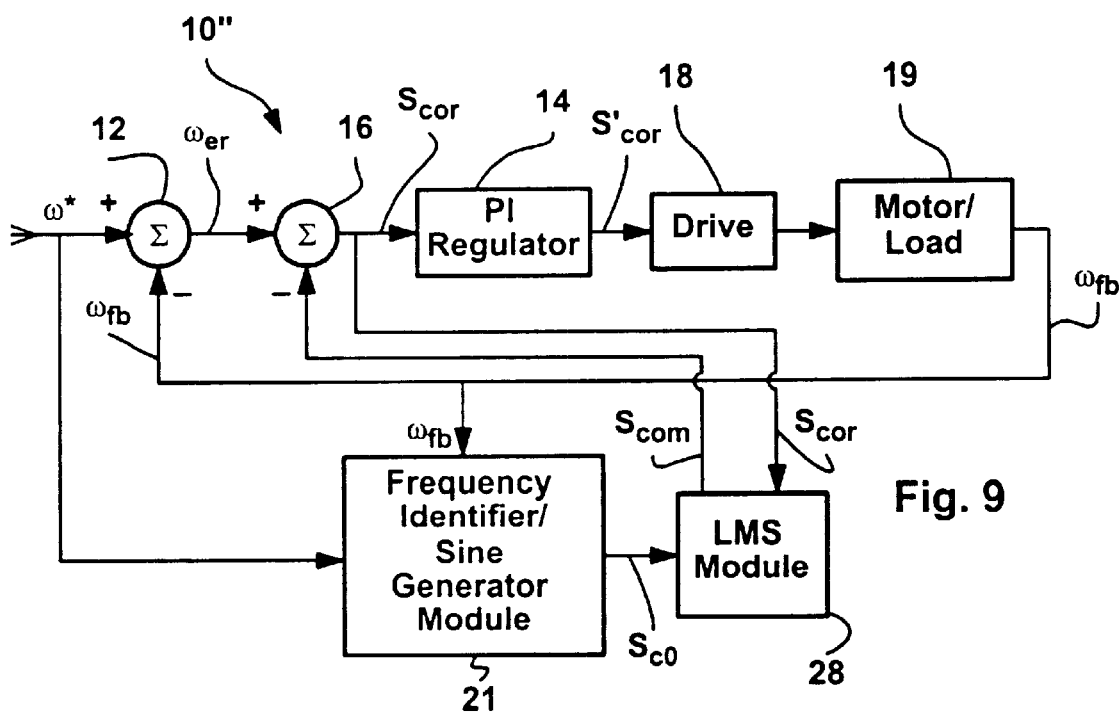
FIG. 9 is a schematic diagram similar to FIG. 1, albeit of one other embodiment of the present invention.

Referring now to FIG. 9, one other system configuration 10" is illustrated. Configuration 10" includes components essentially identical to the components described above which are identified by identical numbers and therefore will not be described here in detail. In fact, configuration 10" is identical to configuration 10' except that the order of summer 16 and PI regulator 14 is reversed so that summer 16 feeds PI regulator 14 instead of the other way around. Here the tuning signal is still taken from the output of summer 16. This embodiment, like the embodiment of FIG. 8 has similar shortcomings (i.e., is minimally effective to deal with cyclic load disturbances).

Figure 10:
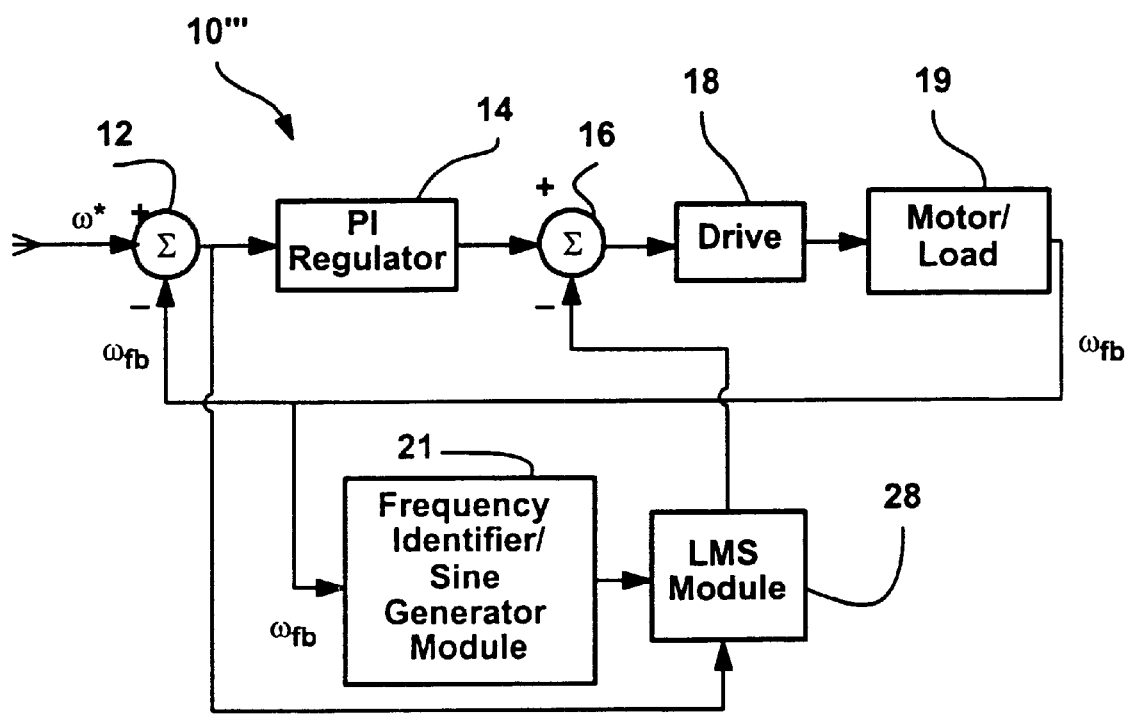
FIG. 10 is a schematic diagram similar to FIG. 1, albeit of yet another embodiment of the present invention.

Referring now to FIG. 10, yet one other system embodiment 10''' 10''' is illustrated which is identical to the configuration illustrated in FIG. 8 except that the input signal to LMS module 28 is the output of first summer 12 (i.e., the velocity error signal $\omega_{er}$) as opposed to the second summer 16. Once again, the system operates as described above.

Referring now to FIG. 11, yet one other advantageous configuration 10'''' of the invention is illustrated. Here, as above, similar components to those described above are identified by the same numerals (e.g., PI regulator 14 is similarly numbered throughout the FIGS.). Configuration 10'''' is different than the configurations described above primarily because configuration 10'''' combines the advantages of LMS module 28 and module 21 with other compensating/filtering components to achieve superior results. More specifically, in addition to providing LMS disturbance compensation as described above, configuration 10'''' also includes a notch filter 13 tuned to eliminate high frequency (e.g. 30 Hz–1 kHz) disturbances and a load estimator 29 that identifies and compensates for low frequency load disturbances.

To this end, it has been recognized that while LMS module 28 may operate to eliminate unintended disturbances at all frequencies, disturbances within certain frequency ranges can be eliminated more efficiently using other filters and compensators. Referring also to FIG. 12, load estimator 29 is designed to identify low frequency load disturbances and to generate a low frequency compensation signal $S_{1fcom}$. Load estimators are well known in the art and therefore will not be explained here in detail. In this regard it should suffice to say that, in at least one embodiment, estimator 29 receives acceleration feedback signal $a_{fb}$ and also receives a corrected signal $S_{cor}$ and combines those signals to generate compensation signal $S_{1fcom}$.

Referring still to FIGS. 11 and 12, notch filter 13 is tuned to filter out all signals within a notch range between approximately 30 Hz and 1 KHz. Any properly tuned notch filter may be employed for this purpose. One advantageous notch filter is described in U.S. Pat. No. 6,144,181 which was issued on Nov. 7, 2000 and is entitled "Method and Apparatus for Reducing Resonance in a Dual Inertia System" and which is incorporated herein, in its entirety, by reference.

Referring yet again to FIG. 11, configuration 10'''' includes a feedback summer 12, a PI regulator 14, filter 13, an LMS summer 16, an estimator summer 23, a current limiter 17, a drive 18, motor/load 19, a frequency identifier/sine generator module 21, an LMS module 28, load estimator 29 and module 80. As above, summer 12 receives both command velocity signal to and velocity feedback signal $\omega_{fb}$ and subtracts the feedback signal $\omega_{fb}$ from command signal $\omega^*$ to generate velocity error signal $\omega_e$. Error signal $\omega_e$ is manipulated by regulator 14 and provided as a modified error output signal $\omega^{*'}$.

Filter 13 receives modified error signal $\omega_e'$ and filters out all high frequency signals thereby generating a notched error signal $S_n$. Notched signal $S_n$ is provided to summers 16 and 23 which each subtract a corresponding compensation signal from notched signal $S_n$ thereby generating the corrected signal $S_{cor}$.

Corrected signal $S_{cor}$ is provided to current limiter 17 which, as its label implies, limits the magnitude of the signal provided to drive 18. Limiter 17 is necessary to ensure that demands placed on drive 18 are consistent with drive and load capabilities.

Referring still to FIG. 11, consistent with the configuration in FIG. 9, module 21 receives velocity feedback signal $\omega_{fb}$ and generates signal $S_{co}$ which is provided to module 28. Module 28 also receives acceleration feedback signal $a_{fb}$ from module 80 and combines the received signals to generate a middle frequency compensation signal $S_{mfcom}$ which is provided to summer 16. Estimator 29 operates as described above to generate low frequency compensation signal $S_{1fcom}$ which is provided to summer 23.

The order of summers 16 and 23 is generally unimportant except that when LMS summer 16 precedes and feeds estimator summer 23, LMS module 28 has to be programmed or tuned to ignore low frequency (e.g., below 2 or 3 Hz) disturbances. Where estimator summer 23 precedes and feeds LMS summer 16, estimator 29 and summer 23 eliminate the low frequency disturbance components and therefore LMS module 28 need not be tuned to ignore low frequency disturbances.

It has been recognized that in certain system configurations the bandwidth of regulator 14 can be increased when an estimator 29 is used in conjunction with an LMS module 28 as in configuration 10'''' which means that the command response of the overall system can be increased appreciably. To this end, for instance, while bandwidth of regulator 14 has, in the past, typically been in the 10 Hz or lower range, with the configuration of FIG. 11, the bandwidth is often extendable all the way through the middle frequency range (e.g., up to 30–35 Hz).

It should be understood that the methods and apparatuses described above are only exemplary and do not limit the scope of the invention, and that various modifications could be made by those skilled in the art that would fall under the scope of the invention. For instance, while an FFT module is described above, it should be appreciated that there may be other ways to determine feedback signal component frequencies. As another example, the amplitudes of the sine waves generated by the sine wave generators need not be identical and the sine waves needn't be aligned as described above. The adaptive nature of the system should accommodate any phase misalignment or amplitude disparity. Moreover, the scalar 38 may not be necessary in certain embodiments. Furthermore, instead of generating sine waves for each disturbance component frequency, a cosine waveform maybe generated for each component frequency. In addition, while all embodiments above employ a velocity feedback signal, other feedback signals such as current or torque will also reflect system resonance and therefore may be employed instead of the velocity feedback signal to generate a suitable compensation signal.

To apprise the public of the scope of this invention, the following claims are made:

What is claimed is:

1. An apparatus for reducing cyclic noise in a motor drive system where the drive system subtracts a velocity feedback signal from a velocity command to generate a velocity error signal and uses the velocity error signal to control other drive system components, the apparatus comprising:

a frequency identifier that receives a velocity feedback signal and identifies unintended frequencies of unintended components of the feedback signal where each unintended component is characterized by a component specific phase and amplitude;

a sine generator that generates a combined signal characterized by a separate sinusoidal component corresponding to each of the undesirable frequencies;

a tuning signal identifier linked to at least one system component output and providing a tuning signal corresponding to the at least one component output;

an LMS module that mathematically combines the combined signal and the tuning signal to generate a compensation signal characterized by a separate component corresponding to each identified unintended frequency where each separate component of the compensation signal is essentially in phase with and has an amplitude similar to a corresponding unintended component; and a regulator module that mathematically combines the velocity error signal and the compensation signal to generate a corrected signal used to control other drive components.

2. The apparatus of claim 1 wherein the sine generator includes a plurality of separate sine modules and a second summer, the transform module providing a separate one of the unintended frequencies to a different one of the sine modules, each sine module receiving an unintended frequency generating a sine wave signal at the unintended frequency, the sine wave signals provided to the second summer and the second summer mathematically combining the sine wave signals to generate the combined signal.

3. The apparatus of claim 2 wherein the second summer mathematically combines by adding the sine wave signals.

4. The apparatus of claim 1 wherein the frequency identifier includes a Fast Fourier Transformer (FFT) module that generates frequency signals corresponding to each frequency present in the feedback signal.

5. The apparatus of claim 4 wherein the frequency identifier further includes a frequency discriminator that receives the frequencies generated by the FFT module and identifies a sub-set of the received frequencies as unintended frequencies.

6. The apparatus of claim 5 wherein the discriminator also receives the command velocity signal and, when the command velocity signal is a square wave having a fundamental frequency, identifies odd multiple harmonics of the command velocity signal and identifies frequencies other than the fundamental frequency and odd multiples of the fundamental frequency that have magnitudes greater than a threshold magnitude as the unintended frequencies.

7. The apparatus of claim 1 wherein the LMS module mathematically combines by altering the phase and amplitude of the combined signal as a function of the tuning signal.

8. The apparatus of claim 7 wherein the combined signal is an original combined signal, LMS module includes N delays, N+1 weighting modules, N+1 integrators, N+1 multipliers and an LMS summer and wherein the delays are serially arranges to receive the combined signal and delay the combined signal to generate N separate and uniquely delayed combined signals, each of the original signal and the delayed signals provided to a separate one of the weighting modules and also to a separate one of the multipliers, each multiplier further receiving the tuning signal and mathematically combining the tuning signal and the corresponding delayed signal and providing an output signal to a separate one of the integrators, each integrator integrating the received output signal and providing a weight signal to a corresponding one of the weighting modules, each weighting module manipulating a corresponding one of the original or delayed signals to generate a weighted signal, the LMS summer receiving and mathematically combining each of the weighted signals to generate the compensation signal.

9. The apparatus of claim 8 wherein each multiplier mathematically combines by multiplying a corresponding one of the original and delayed signals and the tuning signal.

10. The apparatus of claim 8 wherein the LMS summer mathematically combines by adding the weighted signals.

11. The apparatus of claim 8 wherein the LMS module further includes a rate gain module that manipulates the tuning signal by a factor k and provides the manipulated error signal as the tuning signal to each of the multipliers.

12. The apparatus of claim 1 wherein the regulator module includes a PI regulator and a summer and wherein the PI regulator receives and manipulates the velocity error signal to generate a modified error signal and the summer subtracts the compensation signal from the modified error signal to generate the corrected signal.

13. The apparatus of claim 12 further including a derivative module that receives the velocity feedback signal and converts the velocity feedback signal into an acceleration feedback signal and, wherein, the acceleration feedback signal is the tuning signal.

14. The apparatus of claim 12 wherein the corrected signal is the tuning signal.

15. The apparatus of claim 12 wherein the velocity error signal is the tuning signal.

16. The apparatus of claim 1 wherein the regulator module further includes a summer that subtracts the compensation signal from the velocity error signal to generate a tuning signal.

17. The apparatus of claim 1 also for substantially reducing the entire range of possible system noise, the apparatus further including a notch filter that receives the velocity error signal and filters out high frequency components of the velocity error signal thereby generating a notched velocity error signal and wherein the regulator module mathematically combines the notched signal and the compensation signal to generate corrected signal.

18. The apparatus of claim 17 wherein the compensation signal is a middle frequency range compensation signal, the apparatus further including a load estimator that also receiving the feedback signal and generates a low frequency compensation signal, the summer also mathematically combining the notched signal and the low frequency compensation signal to generate the corrected signal.

19. The apparatus of claim 18 wherein the regulator module includes each of an LMS summer and an estimator summer and wherein the LMS summer and the estimator summer mathematically combine by subtracting the middle frequency range signal and low frequency range signal from the notched signal, respectively.

20. The apparatus of claim 19 wherein the LMS summer is between the notch filter and the estimator summer and wherein the frequency identifier limits unintended components to frequencies within a middle frequency range.

21. The apparatus of claim 19 wherein the estimator summer is between the notch filter and the LMS summer.

22. The apparatus of claim 21 wherein the middle frequency range is between 3 and 30 Hz.

23. The apparatus of claim 1 wherein the compensation signal is a middle frequency compensation signal and further including a load estimator, the estimator also receiving the system feedback signal and generating a low frequency compensation signal, the regulator module also mathematically combining the velocity error signal and the low frequency compensation signal to generate the corrected signal.

24. The apparatus of claim 23 wherein the summer includes each of an LMS summer and an estimator summer and wherein the LMS summer and the estimator summer mathematically combine by subtracting the middle frequency compensation signal and low frequency compensation signal from the manipulated velocity error signal, respectively.

25. The apparatus of claim 24 wherein the LMS summer feeds the estimator summer.

26. A method for reducing cyclic noise in a motor drive where the drive subtracts a velocity feedback signal from a velocity command to generate a velocity error signal and uses the velocity error signal to control other drive components, the method comprising the steps of:
obtaining a system velocity feedback signal;
identifying unintended frequencies of unintended components of the feedback signal where each unintended component is characterized by a component specific phase and amplitude;
generating a combined signal characterized by a separate sinusoidal component corresponding to each of the undesirable frequencies;
identifying a tuning signal corresponding to at least one system component output;
mathematically combining the combined signal and the tuning signal to generate a compensation signal characterized by a separate component corresponding to each identified unintended frequency where each separate component of the compensation signal is essentially in phase with and has an amplitude similar to a corresponding unintended component; and
mathematically combining the velocity error signal and the compensation signal to generate a corrected signal used to control other drive components.

27. The method of claim 26 wherein the step of generating the combined signal includes the steps of generating separate sine wave signals at each of the unintended frequencies and mathematically combining the sine wave signals to generate the combined signal.

28. The method of claim 27 wherein the step of mathematically combining the sine wave signals includes the step of adding the sine wave signals.

29. The method of claim 26 wherein the step of identifying includes the step of performing a Fast Fourier Transformer (FFT) on the feedback signal.

30. The method of claim 29 wherein the step of identifying further includes, when the command velocity signal is a square wave having a fundamental frequency, identifying odd multiple harmonics of the command velocity signal and identifying frequencies other than the fundamental frequency of the command velocity signal and odd multiples of the fundamental frequency that have magnitudes greater than a threshold magnitude as the unintended frequencies.

31. The method of claim 26 wherein the step of mathematically combining the combined signal and the tuning signal includes altering the phase and amplitude of the combined signal as a function of the tuning signal.

32. The method of claim 31 wherein the combined signal is an original combined signal and the step of altering the phase and amplitude includes the steps of delaying the combined signal to generate N separate and uniquely delayed combined signals, for each of the original combined signal and delayed combined signals:
(i) mathematically combining each of the original and delayed combined signals with the tuning signal to generate an output signal;
(ii) integrating the output signal to generate a weight signal; and
(iii) mathematically combining the weight signal and the corresponding combined signal to generate a weighted signal; and mathematically combining the weighted signals to generate the compensation signal.

33. The method of claim 32 wherein each step of mathematically combining to generate an output signal includes the step of multiplying.

34. The method of claim 32 wherein the step of mathematically combining the weighted signals includes the step of adding the weighted signals.

35. The method of claim 26 wherein the step of mathematically combining the velocity error signal and the compensation signal includes providing the error signal to a PI regulator that manipulates the velocity error signal to generate a modified error signal and subtracting the compensation signal from the modified error signal to generate the corrected signal.

36. The method of claim 35 further including taking the derivative of the velocity feedback signal to generate an acceleration feedback signal and, wherein, the acceleration feedback signal is the tuning signal.

37. The apparatus of claim 35 wherein the corrected signal is the tuning signal.

38. The apparatus of claim 35 wherein the velocity error signal is the tuning signal.

39. The method of claim 26 also for substantially reducing the entire range of possible system noise, the method further including the step of providing a notch filter that receives the manipulated velocity error signal and filters out high frequency components of the velocity error signal thereby generating a notched velocity error signal and wherein the step of mathematically combining to generate the corrected error signal includes combining the notched signal and the compensation signal.

40. The method of claim 39 wherein the compensation signal is a middle frequency range compensation signal, the method further including the steps of receiving the system feedback signal and generating a low frequency compensation signal as a function thereof, the step of mathematically combining also including the steps of combining the notched signal and the low frequency compensation signal to generate the corrected signal.

41. The method of claim 40 wherein the step of mathematically combining to generate the corrected signal includes the steps of subtracting each of the low frequency compensation signal and the middle frequency compensation signal from the notched signal.

42. The method of claim 41 wherein the step of subtracting the middle frequency compensation signal from the notched signal precedes the step of subtracting the low frequency compensation signal and wherein the step of identifying includes limiting unintended components to frequencies within a middle frequency range.

43. The method of claim 41 wherein the step of subtracting the middle frequency compensation signal from the notched signal follows the step of subtracting the low frequency compensation signal.

44. The method of claim 43 wherein the middle frequency range is between 3 and 30 Hz.

45. The method of claim 26 wherein the compensation signal is a middle frequency compensation signal and further including a load estimator, the estimator also receiving the system feedback signal and generating a low frequency compensation signal, the summer also mathematically combining the manipulated velocity error signal and the low frequency compensation signal to generate the corrected signal.

46. The method of claim 45 wherein the summer includes each of an LMS summer and an estimator summer and wherein the LMS summer and the estimator summer mathematically combine by subtracting the middle frequency compensation signal and low frequency compensation signal from the velocity error signal, respectively.

47. An apparatus for reducing cyclic noise in a motor drive where the drive subtracts a velocity feedback signal from a velocity command to generate a velocity error signal and uses the velocity error signal to control other drive components, the apparatus comprising:

a processor running a pulse sequencing program to perform the steps of:
obtaining a system feedback signal;
identifying unintended frequencies of unintended components of the feedback signal where each unintended component is characterized by a component specific phase and amplitude;
generating a combined signal characterized by a separate sinusoidal component corresponding to each of the undesirable frequencies;
identifying a system tuning signal corresponding to at least one system component output;
mathematically combining the combined signal and the tuning signal to generate a compensation signal characterized by a separate component corresponding to each identified unintended frequency where each separate component of the compensation signal is essentially in phase with and has an amplitude similar to a corresponding unintended component; and
mathematically combining the velocity error signal and the compensation signal to generate the corrected signal used to control other drive components.

48. An apparatus for reducing noise in a motor drive within a full frequency range where the drive subtracts a velocity feedback signal from a velocity command to generate a velocity error signal and uses the velocity error signal to control other drive components, the apparatus comprising:

a notch filter that receives the manipulated error signal, the notch filter tuned to eliminate high frequency disturbances from the error signal and generating a notched signal;

an LMS filter that receives a system feedback signal and identifies unintended frequency components in a middle frequency range of the feedback signal and mathematically combines the received signals to generate a middle frequency range compensation signal;

a load estimator that receives the system feedback signal and also receives a corrected control signal and mathematically combines the received signals to generate a low frequency compensation signal;

a summer that receives the notched signal, the low frequency compensation signal and the middle frequency compensation signal and mathematically combines the received signals to generate the corrected control signal, the corrected signal used to control other drive components.

49. The apparatus of claim 48 further including a PI regulator that receives the error signal and manipulates the error signal to provide a manipulated error signal that is provided to the notch filter.

50. The apparatus of claim 48 wherein the summer includes an LMS summer and an estimator summer that mathematically combine the notched signal and the middle and low frequency compensation signals, respectively, to generate the corrected signal.

51. The apparatus of claim 48 wherein the LMS summer precedes the estimator summer.

* * * * *